US008712563B2

(12) United States Patent
Milbrandt et al.

(10) Patent No.: US 8,712,563 B2
(45) Date of Patent: Apr. 29, 2014

(54) METHOD AND APPARATUS FOR INTERACTIVE DISTRIBUTION OF DIGITAL CONTENT

(75) Inventors: Celite Milbrandt, Austin, TX (US); Safdar Asghar, Austin, TX (US); Bradley D. Kindig, San Diego, CA (US)

(73) Assignee: Slacker, Inc., San Diego, CA (US)

( * ) Notice: Subject to any disclaimer, the term of this patent is extended or adjusted under 35 U.S.C. 154(b) by 1222 days.

(21) Appl. No.: 11/955,299

(22) Filed: Dec. 12, 2007

(65) Prior Publication Data

US 2008/0215170 A1 Sep. 4, 2008

Related U.S. Application Data

(63) Continuation-in-part of application No. 11/637,300, filed on Dec. 12, 2006, now abandoned.

(60) Provisional application No. 60/862,736, filed on Oct. 24, 2006, provisional application No. 60/894,892, filed on Mar. 14, 2007, provisional application No. 60/894,879, filed on Mar. 14, 2007, provisional application No. 60/893,849, filed on Mar. 8, 2007, provisional application No. 60/892,083, filed on Feb. 28, 2007, provisional application No. 60/893,840, filed on Mar. 8, 2007, provisional application No. 60/886,283, filed on Jan. 23, 2007.

(51) Int. Cl.
*G06F 17/00* (2006.01)
*G05B 19/02* (2006.01)
*G06F 3/00* (2006.01)
*G06F 13/00* (2006.01)
*H04N 5/445* (2011.01)

(52) U.S. Cl.
USPC ............................... 700/94; 340/4.37; 725/46

(58) Field of Classification Search
USPC ................... 700/94; 709/202, 203, 230, 231; 715/716, 727; 725/9, 13, 14, 16, 60, 725/61, 86, 87; 340/4.37, 4.4
See application file for complete search history.

(56) References Cited

U.S. PATENT DOCUMENTS

| 4,881,078 A | 11/1989 | Yamane et al. |
| 4,914,448 A | 4/1990 | Ostsuka et al. |

(Continued)

FOREIGN PATENT DOCUMENTS

| EP | 0 406 845 B1 | 1/1994 |
| EP | 1610145 A | 12/2005 |

(Continued)

OTHER PUBLICATIONS

Pandora, "Frequently Asked Questions", Aug. 30, 2006, Pandora Media Inc., all pages.*

(Continued)

*Primary Examiner* — Jesse Elbin
(74) *Attorney, Agent, or Firm* — Cooley LLP

(57) ABSTRACT

A system, method, and machine-readable medium are disclosed for the controlled, non-real-time conveyance of digital content for playback. Digital content and associated metadata are marked, rated, categorized, and then converted into encoded digital data. The resulting encoded digital data is transmitted as a plurality of data streams through a communications facility such as a satellite, wireless, or physical network. The data streams are received by a content receiver where they are decoded into metadata and digital content for controlled conveyance and playback. A digital content management module comprising a content selection algorithm compares metadata associated with candidate digital content to a predetermined content selection profile. If the metadata matches predetermined selection parameters of the selection profile, the candidate digital content and its associated metadata are stored in a machine-readable medium for controlled conveyance and playback.

17 Claims, 9 Drawing Sheets

(56) References Cited

U.S. PATENT DOCUMENTS

| | | |
|---|---|---|
| 5,038,211 A | 8/1991 | Hallenbeck |
| 5,311,175 A | 5/1994 | Waldman |
| 5,666,113 A | 9/1997 | Logan |
| 5,923,267 A | 7/1999 | Beuk et al. |
| 5,977,964 A | 11/1999 | Williams et al. |
| 6,004,135 A | 12/1999 | Trattner et al. |
| 6,023,242 A | 2/2000 | Dixon |
| 6,049,306 A | 4/2000 | Amarillas |
| 6,349,339 B1 | 2/2002 | Williams |
| 6,351,596 B1 | 2/2002 | Ostrover |
| 6,388,345 B1 | 5/2002 | Stimpson |
| 6,437,774 B1 | 8/2002 | Tsuji et al. |
| 6,553,222 B1 | 4/2003 | Weiss |
| 6,563,805 B1 | 5/2003 | Marko et al. |
| 6,564,003 B2 | 5/2003 | Marko et al. |
| 6,587,127 B1 | 7/2003 | Leeke et al. |
| 6,658,062 B1 | 12/2003 | Nakatsuyama |
| 6,680,677 B1 | 1/2004 | Tiphane |
| 6,778,841 B1 | 8/2004 | Bories et al. |
| 6,785,656 B2 | 8/2004 | Patsiokas et al. |
| 6,795,702 B2 | 9/2004 | Sennett |
| 6,822,635 B2 | 11/2004 | Shahoian et al. |
| 6,834,156 B1 | 12/2004 | Marko et al. |
| 6,876,835 B1 | 4/2005 | Marko et al. |
| 6,904,055 B2 | 6/2005 | Pichna et al. |
| 6,934,917 B2 | 8/2005 | Lin |
| 6,972,363 B2 | 12/2005 | Georges et al. |
| 6,985,694 B1 | 1/2006 | De Bonet et al. |
| 7,010,263 B1 | 3/2006 | Patsiokas et al. |
| 7,028,082 B1 | 4/2006 | Rosenberg et al. |
| 7,035,932 B1 | 4/2006 | Dowling |
| 7,057,521 B1 | 6/2006 | Beuk et al. |
| 7,106,221 B2 | 9/2006 | Horton et al. |
| 7,187,947 B1 | 3/2007 | White et al. |
| 7,216,008 B2 | 5/2007 | Sakata |
| 7,232,973 B2 | 6/2007 | Kaps et al. |
| 7,251,452 B2 | 7/2007 | Stumphauzer, II |
| 7,293,066 B1 | 11/2007 | Day |
| 7,352,331 B2 | 4/2008 | Quagliaro |
| 7,403,910 B1 | 7/2008 | Hastings et al. |
| 7,483,964 B1 | 1/2009 | Jackson et al. |
| 7,526,728 B2 | 4/2009 | Apparao et al. |
| 7,555,539 B1 | 6/2009 | Rosenberg et al. |
| 7,680,959 B2 | 3/2010 | Svendsen |
| 7,756,388 B2 | 7/2010 | Plastina et al. |
| 7,884,274 B1 | 2/2011 | Wieder |
| 7,890,874 B2 | 2/2011 | Kaufman |
| 7,953,032 B2 | 5/2011 | Liang |
| 8,050,652 B2 | 11/2011 | Qureshey et al. |
| 8,204,073 B1 | 6/2012 | Gailloux et al. |
| 2001/0005900 A1 | 6/2001 | Yoshida et al. |
| 2002/0016643 A1 | 2/2002 | Sakata |
| 2002/0041692 A1 | 4/2002 | Seto et al. |
| 2002/0073225 A1 | 6/2002 | Dillon et al. |
| 2002/0082901 A1 | 6/2002 | Dunning et al. |
| 2002/0092019 A1 | 7/2002 | Marcus |
| 2002/0158838 A1 | 10/2002 | Smith et al. |
| 2002/0164973 A1 | 11/2002 | Janik et al. |
| 2002/0184111 A1 | 12/2002 | Swanson |
| 2002/0199194 A1 | 12/2002 | Ali et al. |
| 2003/0006892 A1 | 1/2003 | Church |
| 2003/0014496 A1 | 1/2003 | Spencer et al. |
| 2003/0027523 A1 | 2/2003 | Lim |
| 2003/0052913 A1 | 3/2003 | Barile |
| 2003/0061611 A1 | 3/2003 | Pendakur |
| 2003/0066090 A1 | 4/2003 | Traw et al. |
| 2003/0073411 A1 | 4/2003 | Meade, II |
| 2003/0089218 A1 | 5/2003 | Gang et al. |
| 2003/0110503 A1 | 6/2003 | Perkes |
| 2003/0122779 A1 | 7/2003 | Martin et al. |
| 2004/0001690 A1 | 1/2004 | Boston et al. |
| 2004/0017316 A1 | 1/2004 | Tanaka et al. |
| 2004/0044677 A1 | 3/2004 | Huper-Graff et al. |
| 2004/0158860 A1 | 8/2004 | Crow |
| 2004/0218067 A1 | 11/2004 | Chen et al. |
| 2004/0220926 A1 | 11/2004 | Lamkin et al. |
| 2004/0267503 A1 | 12/2004 | Batterberry et al. |
| 2005/0108754 A1 | 5/2005 | Carhart et al. |
| 2005/0114794 A1 | 5/2005 | Grimes et al. |
| 2005/0120305 A1 | 6/2005 | Engstrom et al. |
| 2005/0172318 A1* | 8/2005 | Dudkiewicz et al. ........... 725/46 |
| 2005/0179668 A1 | 8/2005 | Edwards |
| 2005/0240661 A1 | 10/2005 | Heller et al. |
| 2006/0022960 A1 | 2/2006 | Fukushima |
| 2006/0031892 A1 | 2/2006 | Cohen |
| 2006/0075007 A1 | 4/2006 | Anderson et al. |
| 2006/0085349 A1 | 4/2006 | Hug |
| 2006/0112082 A1 | 5/2006 | Platt et al. |
| 2006/0123053 A1 | 6/2006 | Scannell, Jr. |
| 2006/0126750 A1 | 6/2006 | Friedman |
| 2006/0149813 A1 | 7/2006 | Janik |
| 2006/0156236 A1 | 7/2006 | Heller et al. |
| 2006/0194535 A1 | 8/2006 | Houldsworth et al. |
| 2006/0195516 A1 | 8/2006 | Beaupre |
| 2006/0195790 A1 | 8/2006 | Beaupre et al. |
| 2006/0200599 A1 | 9/2006 | Manchester et al. |
| 2006/0206478 A1 | 9/2006 | Glaser et al. |
| 2006/0206493 A1 | 9/2006 | Lipscomb et al. |
| 2006/0212442 A1 | 9/2006 | Conrad et al. |
| 2006/0212444 A1 | 9/2006 | Handman et al. |
| 2006/0227905 A1 | 10/2006 | Kunysz et al. |
| 2006/0235864 A1 | 10/2006 | Hotelling et al. |
| 2006/0238517 A1 | 10/2006 | King et al. |
| 2006/0239131 A1 | 10/2006 | Nathan et al. |
| 2006/0265329 A1 | 11/2006 | Hug |
| 2006/0265421 A1 | 11/2006 | Ranasinghe et al. |
| 2007/0013593 A1 | 1/2007 | Zafar et al. |
| 2007/0073728 A1 | 3/2007 | Klein et al. |
| 2007/0078899 A1 | 4/2007 | Gulin et al. |
| 2007/0079352 A1 | 4/2007 | Klein, Jr. |
| 2007/0089057 A1 | 4/2007 | Kindig |
| 2007/0152975 A1 | 7/2007 | Ogihara et al. |
| 2007/0152977 A1 | 7/2007 | Ng et al. |
| 2007/0156589 A1 | 7/2007 | Zimler et al. |
| 2007/0174147 A1 | 7/2007 | Klein, Jr. |
| 2007/0220552 A1 | 9/2007 | Juster et al. |
| 2007/0236472 A1 | 10/2007 | Bentsen et al. |
| 2007/0239856 A1 | 10/2007 | Abadir |
| 2007/0281704 A1 | 12/2007 | Lin et al. |
| 2007/0300158 A1 | 12/2007 | Kasperkiewicz et al. |
| 2008/0009268 A1 | 1/2008 | Ramer et al. |
| 2008/0052630 A1 | 2/2008 | Rosenbaum et al. |
| 2008/0086379 A1 | 4/2008 | Dion et al. |
| 2008/0162570 A1 | 7/2008 | Kindig et al. |
| 2008/0222546 A1 | 9/2008 | Mudd et al. |
| 2009/0017866 A1 | 1/2009 | White et al. |
| 2009/0019374 A1 | 1/2009 | Logan et al. |
| 2009/0031007 A1 | 1/2009 | Boic et al. |
| 2011/0107381 A1 | 5/2011 | Solnik et al. |

FOREIGN PATENT DOCUMENTS

| | | |
|---|---|---|
| GB | 2343053 | 4/2000 |
| WO | WO 9912230 A | 3/1999 |
| WO | 0135667 A1 | 5/2001 |
| WO | 2004097803 | 11/2004 |
| WO | WO 2005034407 A | 4/2005 |
| WO | WO 2005076117 A1 | 8/2005 |
| WO | 2006042309 A1 | 4/2006 |
| WO | 2006124277 A1 | 11/2006 |

OTHER PUBLICATIONS

U.S. Appl. No. 12/049,113 Non-Final Rejection mailed Jan. 25, 2011.

U.S. Appl. No. 12/032,637 Non-Final Rejection mailed Mar. 21, 2011.

Motorola, "Complexity analysis of the Motorola Turbo Code Interleaver" TSG-RAN Working Group Meeting, XX, XX, Mar. 22, 1999, pp. 1-6, XP002194524.

PCT/US07/072954 International Search Report mailed Feb. 1, 2008.

PCT/US07/072954 Written Opinion mailed Feb. 1, 2008.

PCT/US07/072954 International Preliminary Report on Patentability mailed Feb. 1, 2008.

(56) References Cited

OTHER PUBLICATIONS

PCT/US07/082373 International Search Report mailed Sep. 22, 2008.
PCT/US07/082373 Written Opinion mailed Sep. 22, 2008.
PCT/US07/082373 International Preliminary Report on Patentability mailed Sep. 22, 2008.
PCT/US08/056451 Written Opinion mailed Jun. 24, 2008.
PCT/US08/056451 International Preliminary Report on Patentability mailed Jun. 24, 2008.
PCT/US08/054184 International Preliminary Report on Patentability mailed Jul. 2, 2008.
PCT/US08/055390 Written Opinion mailed Aug. 22, 2008.
PCT/US08/055390 International Preliminary Report on Patentability, Sep. 1, 2009.
PCT/US08/055197 Written Opinion mailed Aug. 29, 2008.
PCT/US08/055197 International Preliminary Report on Patentability mailed Aug. 29, 2008.
PCT/US08/056899 International Search Report mailed Mar. 27, 2009.
PCT/US08/056899 International Preliminary Report on Patentability, Sep. 15, 2009.
PCT/US08/056899 Written Opinion mailed Mar. 27, 2009.
PCT/US07/087305 International Search Report and Written Opinion mailed Jul. 3, 2008.
PCT/US07/087305 International Preliminary Report on Patentability mailed Jul. 3, 2008.
PCT/US08-057110 International Search Report and Written Opinion mailed Aug. 5, 2008.
PCT/US08-057110 International Preliminary Report on Patentability mailed Aug. 5, 2008.
Tell, E., and Liu, Dake, "A hardware architecture for a multi mode block interleaver", Proc. ICCSC (online) Jul. 2004, XP002492258, figures 1, 2.
U.S. Appl. No. 11/774,481 Non-Final Office Action mailed Apr. 29, 2010.
U.S. Appl. No. 11/923,554 Non-Final Office Action mailed Dec. 23, 2009.
U.S. Appl. No. 11/637,300 Non-Final Rejection Sep. 30, 2008.
U.S. Appl. No. 12/039,692 Non-Final Rejection Nov. 24, 2010.
U.S. Appl. No. 12/011,193 Non-Final Office Action mailed Nov. 10, 2010.
EP08754882 Office Action mailed Feb. 11, 2010.
U.S. Appl. No. 11/923,573 Final Office Action mailed Jun. 22, 2011.
U.S. Appl. No. 11/923,573 Non-Final Office Action mailed Oct. 14, 2010.
U.S. Appl. No. 11/923,554 Final Office Action mailed Nov. 12, 2010.
Wikipedia—Pandora Radio, Oct. 7, 2006, http://en,wikipedia.org/w/index.php?title=Pandora_Radio&oldid=80072157.
Carlvik, "IP-Based Personalized Media On Demand," Issue 97, World Telecommunications Congress, Toronto, Sep. 21, 1997, XP000704488, pp. 365-370.
PCT/US08/056451 International Search Report mailed Jun. 24, 2008.
PCT/US08/054184 International Search Report and Written Opinion mailed Jul. 2, 2008.
PCT/US08/055390 International Search Report mailed Aug. 22, 2008.
PCT/US08/055197 International Search Report mailed Aug. 29, 2008.
U.S. Appl. No. 12/045,666 Non-Final Office Action mailed Oct. 6, 2011.
European Search Report for European Application EP07868561, mailed Jan. 2, 2012.
Office Action for U.S. Appl. No. 12/582,675, mailed Nov. 23, 2012.
Office Action for U.S. Appl. No. 13/106,754, mailed Jul. 3, 2012.
Office Action for U.S. Appl. No. 12/011,193, mailed Jul. 22, 2011.
Office Action for U.S. Appl. No. 12/011,193, mailed Nov. 16, 2011.
Office Action for U.S. Appl. No. 12/045,666, mailed Jun. 4, 2012.
Office Action for U.S. Appl. No. 12/048,128, mailed Dec. 23, 2011.
Office Action for U.S. Appl. No. 12/048,128, mailed Sep. 13, 2012.

\* cited by examiner

METHOD AND APPARATUS FOR INTERACTIVE DISTRIBUTION OF DIGITAL CONTENT

CROSS-REFERENCE TO RELATED APPLICATIONS

This application is a continuation in part of and claims priority to co-pending U.S. Utility patent application Ser. No. 11/637,300, entitled METHOD AND APPARATUS FOR INTERACTIVE DISTRIBUTION OF DIGITAL CONTENT, filed Dec. 12, 2006. This application is also related to U.S. Utility patent application Ser. No. 11/923,573, entitled METHODS AND SYSTEMS FOR PERSONALIZED RENDERING OF DIGITAL MEDIA CONTENT, filed Oct. 24, 2007, to U.S. Utility patent application Ser. No. 11/923,554, entitled SYSTEMS AND DEVICES FOR PERSONALIZED RENDERING OF DIGITAL MEDIA CONTENT, filed Oct. 24, 2007, to U.S. Provisional Patent Application Ser. No. 60/894,892, entitled SYSTEM AND METHOD OF UTILIZING MULTIPLE SATELLITE TRANSPONDERS FOR DATA DISTRIBUTION, filed Mar. 14, 2007, to U.S. Provisional Patent Application Ser. No. 60/894,879, entitled SYSTEM AND METHOD FOR PORTABLE, PERSONALIZED RADIO, filed Mar. 14, 2007, to U.S. Provisional Patent Application Ser. No. 60/893,849, entitled DEVICES AND METHODS FOR DISTRIBUTING DIGITAL CONTENT INCLUDING WEB APPLICATIONS, filed Mar. 8, 2007, to U.S. Provisional Patent Application Ser. No. 60/893,840, entitled DEVICES AND METHODS FOR DISTRIBUTING DIGITAL CONTENT INCLUDING JUKEBOX APPLICATIONS, filed Mar. 8, 2007, to U.S. Provisional Patent Application Ser. No. 60/892,083, entitled ANTENNA ARRAY FOR A HI/LO ANTENNA BEAM PATTERN AND METHOD OF UTILIZATION, filed Feb. 28, 2007, to U.S. Provisional Patent Application Ser. No. 60/890,164, entitled SYSTEMS AND METHODS FOR SATELLITE AUGMENTED WIRELESS COMMUNICATION NETWORKS, filed Feb. 15, 2007, to U.S. Provisional Patent Application Ser. No. 60/886,283, entitled DEVICES AND METHODS FOR DISTRIBUTING DIGITAL CONTENT, filed Jan. 23, 2007, and to U.S. Provisional Patent Application Ser. No. 60/862,736, entitled METHOD AND DEVICE FOR PLAYBACK OF LOCALLY-STORED DIGITAL MEDIA CONTENT, filed Oct. 24, 2006. The contents of each of these applications is hereby incorporated by reference herein in its entirety for all purposes.

FIELD OF THE INVENTION

The present invention relates generally to the field of digital content delivery. More particularly but not exclusively, the invention relates to systems and methods for providing controlled, non-real-time conveyance of digital content for playback on fixed and mobile devices.

BACKGROUND

Traditional over the air broadcast mediums, such as AM/FM radio and television, provide a relatively limited selection of program material that is intended to have the broadest appeal to the largest possible audience. Radio stations generally follow a set programming format, typically coupled with a particular genre of music that is designed to attract a target listening audience. Broadcast television stations, while somewhat constrained to the prime-time entertainment and national news offering of their network affiliations, follow similar guidelines for local broadcasts. The introduction of cable and satellite television programming simultaneously increased the number of channels available to subscribers and the amount and diversity of available program content. This trend has continued in recent years with an ever-broadening array of more and more specialized programming channels (e.g., the Food Channel, the History Channel, etc.) that address specific viewer interests.

Nevertheless, the programmed delivery of these diverse program content channels remained passive until the advent and wide-spread adoption of the digital video recorder (DVR). It is now possible for subscribers to not only time shift the consumption of their preferred video content, but to also selectively record video content corresponding to their viewing preferences through the automatic and dynamic generation of viewer profiles. Satellite radio has undergone a similar evolution and currently offers numerous channels providing a broad selection of musical genres programmed to appeal to an equally wide variety of target audiences. However, satellite radio offerings are still passive as they fail to offer an opportunity for the user to customize and interact with their program content. While users may be free to choose from the genre of music they listen to by selecting a particular station, they do not have the ability to further customize the selected station to their personal preferences.

Furthermore, real-time broadcast signals, including those of satellite radio, can be lost, resulting in the user's listening experience being interrupted. As an alternative, the user can download digital media files to a traditional media player. The current popularity of the MP3 music format has proven it to be an effective solution for creating a highly portable and customized selection of music content. However, large digital music libraries still require significant time and effort to manage and the media players that contain them are often complex to operate. Conversely, simpler-to-use digital media players are often limited in memory capacity or file management capability, so the user must waste time manually deleting files in order to download additional ones.

SUMMARY

In one or more embodiments, the present invention provides a system, method, and machine-readable medium for the controlled, non-real-time conveyance of digital content for playback.

In some embodiments, digital content and associated metadata are marked, rated, categorized, and then converted into encoded digital data. The encoded digital data may then be transmitted as a plurality of data streams through a distribution network to a terrestrial satellite uplink where they are transmitted to a satellite. The satellite then broadcasts the data streams as a downlink transmission to a plurality of digital content receivers. In addition to, or in place of satellite transmission, the encoded digital data may be transmitted via other networks such as wired, wireless, or combination wired and wireless networks, such as Wi-Fi (802.11) or other wired or wireless networks. In some embodiments, content may be received simultaneously from both satellite and other wired and/or wireless networks.

The received data streams may then be decoded into metadata and digital content for controlled conveyance and playback. A digital content management module comprising a content selection algorithm may then compare metadata associated with candidate digital content to a predetermined content selection profile. If the metadata matches predetermined selection parameters of the selection profile, the candidate digital content and its associated metadata may then be stored in a machine-readable medium for selected conveyance, storage, and playback.

In some embodiments, content selection profiles comprising the user's content preferences are created and edited through user interaction with the digital content management module. User preferences, such as genre of music, era, performer, popularity, time-of-day, and the like may be chosen and stored as selection parameters in one or more content selection profiles.

In some embodiments, user operations during digital content playback are captured and then correlated to the digital content's associated metadata by the content selection algorithm. The resulting user operation patterns may then be used by the digital content management module to modify the selection parameters of the selection profile in use during playback of the digital content. User actions during playback that correlate to approval or disapproval of the digital content result in content selection parameters being weighted for or against digital content that comprises similar metadata.

In some embodiments, the digital content management module similarly applies the content selection algorithm to the stored digital content and metadata to determine the order in which it will be played. In one embodiment, the stored digital content and metadata is retrieved using a first-in, first-out sequence for playback. In another embodiment, the selection algorithm generates a content selection rating value that is appended to the metadata of the stored digital content. The content selection rating value is then used by the digital content management module to prioritize the playback order of the stored content and metadata. In another embodiment, the content selection algorithm chooses the content to play nearly contemporaneously with playback, thus maximizing access to newly received content and accounting for the most recent events or user actions that may affect the selection.

Additional aspects of the present invention are described and illustrated herein in conjunction with the detailed description and drawings.

BRIEF DESCRIPTION OF THE DRAWINGS

The present invention may be better understood, and its numerous objects, features and advantages made apparent to those skilled in the art, by referencing the accompanying drawings. The use of the same reference number throughout the several figures designates a like or similar element.

DETAILED DESCRIPTION OF EMBODIMENTS OF THE INVENTION

Figure 1:
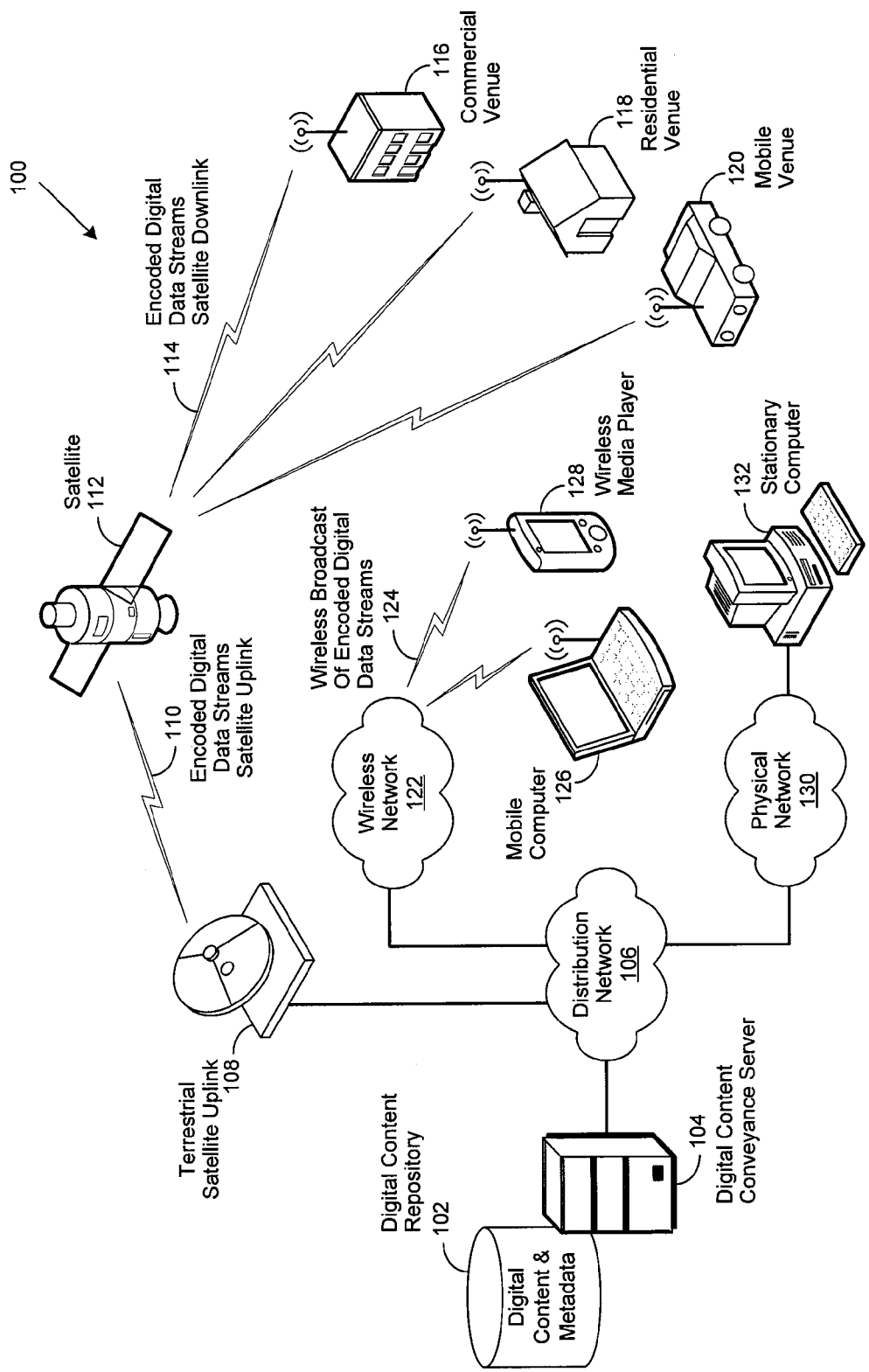
FIG. 1 is a generalized illustration of a digital information conveyance system as implemented in accordance with an embodiment of the invention.

This application is related to the following U.S. patent applications (also collectively denoted herein as the "related applications"): U.S. Utility patent application Ser. No. 11/637,300, entitled METHOD AND APPARATUS FOR INTERACTIVE DISTRIBUTION OF DIGITAL CONTENT; U.S. Utility patent application Ser. No. 11/923,573, entitled METHODS AND SYSTEMS FOR PERSONALIZED RENDERING OF DIGITAL MEDIA CONTENT; U.S. Utility patent application Ser. No. 11/923,554, entitled SYSTEMS AND DEVICES FOR PERSONALIZED RENDERING OF DIGITAL MEDIA CONTENT; U.S. Provisional Patent Application Ser. No. 60/894,892, entitled SYSTEM AND METHOD OF UTILIZING MULTIPLE SATELLITE TRANSPONDERS FOR DATA DISTRIBUTION; U.S. Provisional Patent Application Ser. No. 60/894,879, entitled SYSTEM AND METHOD FOR PORTABLE, PERSONALIZED RADIO; U.S. Provisional Patent Application Ser. No. 60/893,849, entitled DEVICES AND METHODS FOR DISTRIBUTING DIGITAL CONTENT INCLUDING WEB APPLICATIONS; U.S. Provisional Patent Application Ser. No. 60/893,840, entitled DEVICES AND METHODS FOR DISTRIBUTING DIGITAL CONTENT INCLUDING JUKEBOX APPLICATIONS; U.S. Provisional Patent Application Ser. No. 60/892,083, entitled ANTENNA ARRAY FOR A HI/LO ANTENNA BEAM PATTERN AND METHOD OF UTILIZATION; U.S. Provisional Patent Application Ser. No. 60/890,164, entitled SYSTEMS AND METHODS FOR SATELLITE AUGMENTED WIRELESS COMMUNICATION NETWORKS; U.S. Provisional Patent Application Ser. No. 60/886,283, entitled DEVICES AND METHODS FOR DISTRIBUTING DIGITAL CONTENT; and U.S. Provisional Patent Application Ser. No. 60/862,736, entitled METHOD AND DEVICE FOR PLAYBACK OF LOCALLY-STORED DIGITAL MEDIA CONTENT. The contents of each of these related applications is hereby incorporated by reference herein in their entirety for all purposes. Various details of aspects of the present invention as are described and illustrated herein may be further embodied as described and illustrated in the related patent applications.

In one or more embodiments, the present invention provides a system, method, and machine-readable medium for the controlled, non-real-time conveyance of digital content for playback.

In some embodiments, digital content and associated metadata are marked, rated, categorized and then converted into encoded digital data. The encoded digital data may then be transmitted as a plurality of data streams through a distribution network to a terrestrial satellite uplink where they are transmitted to a satellite. The satellite then broadcasts the data streams as a downlink transmission to a plurality of digital content receivers. In addition to, or in place of satellite transmission, the encoded digital data may be simultaneously or sequentially transmitted via other networks such as wired, wireless, or combination wired and wireless networks, such as Wi-Fi (IEEE 802.11) or other wired or wireless networks. Such other networks may support either unidirectional (broadcast) or bi-directional data connections with the portable device. Likewise, content may be received by the digital content receivers either simultaneously or sequentially from satellite and/or other wired or wireless networks.

The received data streams may then be decoded into metadata and digital content for controlled conveyance and playback. A digital content management module comprising a content selection algorithm may then compare metadata associated with candidate digital content to a predetermined content selection profile. If the metadata matches predetermined selection parameters of the selection profile, the candidate digital content and its associated metadata may then be stored in a machine-readable medium for selected conveyance, storage, and playback.

In some embodiments, content selection profiles comprising the user's content preferences are created and edited through user interaction with the digital content management module. User preferences, such as genre of music, era, performer, popularity, time-of-day, and the like may be chosen and stored as selection parameters in one or more content selection profiles.

In some embodiments, user operations during digital content playback are captured and then correlated to the digital content's associated metadata by the content selection algorithm. The resulting user operation patterns may then be used by the digital content management module to modify the selection parameters of the selection profile in use during playback of the digital content. User actions during playback that correlate to approval or disapproval of the digital content result in content selection parameters being weighted for or against digital content that comprises similar metadata.

In some embodiments, the digital content management module similarly applies the content selection algorithm to the stored digital content and metadata to determine the order in which it will be played. In one embodiment, the stored digital content and metadata is retrieved using a first-in, first-out sequence for playback. In another embodiment, the selection algorithm generates a content selection rating value that is appended to the metadata of the stored digital content. The content selection rating value is then used by the digital content management module to prioritize the playback order of the stored content and metadata. In another embodiment, the content selection algorithm chooses the content to play nearly contemporaneously with playback, thus maximizing access to newly received content and accounting for the most recent events or user actions that may affect the selection.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), or via other communication, networking, or distribution means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider (ISP)).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will also be noted that flowchart boxes, steps, or stages as described herein are provided for purposes of illustration, not limitation. Additional and/or alternate methods or processes having fewer, more, and/or different boxes, steps, or stages may also be used in keeping within the spirit and scope of the present invention.

FIG. 1 is a generalized illustration of a digital information conveyance system 100 as implemented in accordance with an embodiment of the invention. In some embodiments, digital information comprising digital content and associated metadata ("metadata") is stored in the digital content repository 102. The digital content conveyance server 104 retrieves metadata stored in the digital content repository 102 and performs marking, rating, and categorization operations familiar to those of skill in the art to prepare it for conveyance. Aspects of these processes are illustrated, for example, in the related applications, and in particular in U.S. Utility patent application Ser. No. 11/923,573, incorporated by reference in its entirety herein. Once these operations have been completed, the prepared metadata and its associated digital content are converted into a plurality of encoded digital data streams ("data streams") for conveyance through distribution network 106.

In one embodiment, the data streams are routed through distribution network 106 to a terrestrial satellite uplink 108 where they are transmitted as an encoded digital data stream 110 to a satellite 112. Once received, the data streams are broadcast by the satellite 112 as a satellite downlink 114 to a plurality of digital content reception venues. In different embodiments, the digital content reception venues may include a commercial venue 116, such as a club or restaurant, a residential venue 118, and/or a mobile venue 120, such as an automobile. Once received, the data streams are decoded into metadata and digital content for controlled conveyance and playback by a content receiver as described in greater detail herein and in the related applications, in particular U.S. Utility patent application Ser. No. 11/923,573, incorporated by reference in its entirety herein.

In another embodiment, the data streams are routed through distribution network 106 to a wireless network 122 where they are wirelessly transmitted. Distribution through such a wireless network may be in addition to, or in place of, distribution through a satellite network. Those of skill in the art will appreciate that in an exemplary embodiment the wireless network 122 may comprise a IEEE 802.11 (WiFi) network. Alternate networks, such as those based on other local or wide area wireless networking schemes such as 802.15 of 802.16 or cellular networks are also fully contemplated herein. For example, wireless network 122 may also comprise a cellular network implemented with data communication capabilities such as General Packet Radio Service (GPRS), Enhanced Data Rates for GSM Evolution (EDGE), or any other cellular data protocol. Furthermore, intermediate physical networks, such as the Internet, may be implemented for the conveyance of the data streams from distribution network 106 to wireless network 122. In some embodiments, the data streams are broadcast 124 to a plurality of wireless-enabled devices, such as a wireless media player 128 and mobile computer 126. Once received, the data streams are decoded into metadata and digital content for controlled conveyance and playback by the wireless media player 128 and mobile computer 126 as described in greater detail herein as well as in the related applications.

In yet another embodiment, the data streams are routed through distribution network 106 to a physical network 130, such as the Internet, to a plurality of stationary computers 132. Once received, the data streams are decoded into metadata and digital content for controlled conveyance and playback by the stationary computer 132 as described in greater detail herein and in the related applications, and in particular U.S. patent application Ser. Nos. 11/923,573, 60/893,849, and 60/893,840, incorporated by reference herein.

It will be appreciated that wireless-enabled devices, such as a wireless media player 128 and mobile computer 126, may wirelessly receive the data streams from wireless network 122 in a plurality of digital content reception venues. In different embodiments, the digital content reception venues for wireless reception may include a commercial venue 116, a residential venue 118, and/or a mobile venue 120. It will be similarly appreciated that stationary devices such as stationary computer 132 may receive the data streams from physical network 130 in likewise stationary venues such as commercial venue 116 and residential venue 118. Other methods and combinations of wireless and physical delivery of the data streams are possible and the examples used herein are not intended to be exhaustive, merely illustrative.

Figure 2:
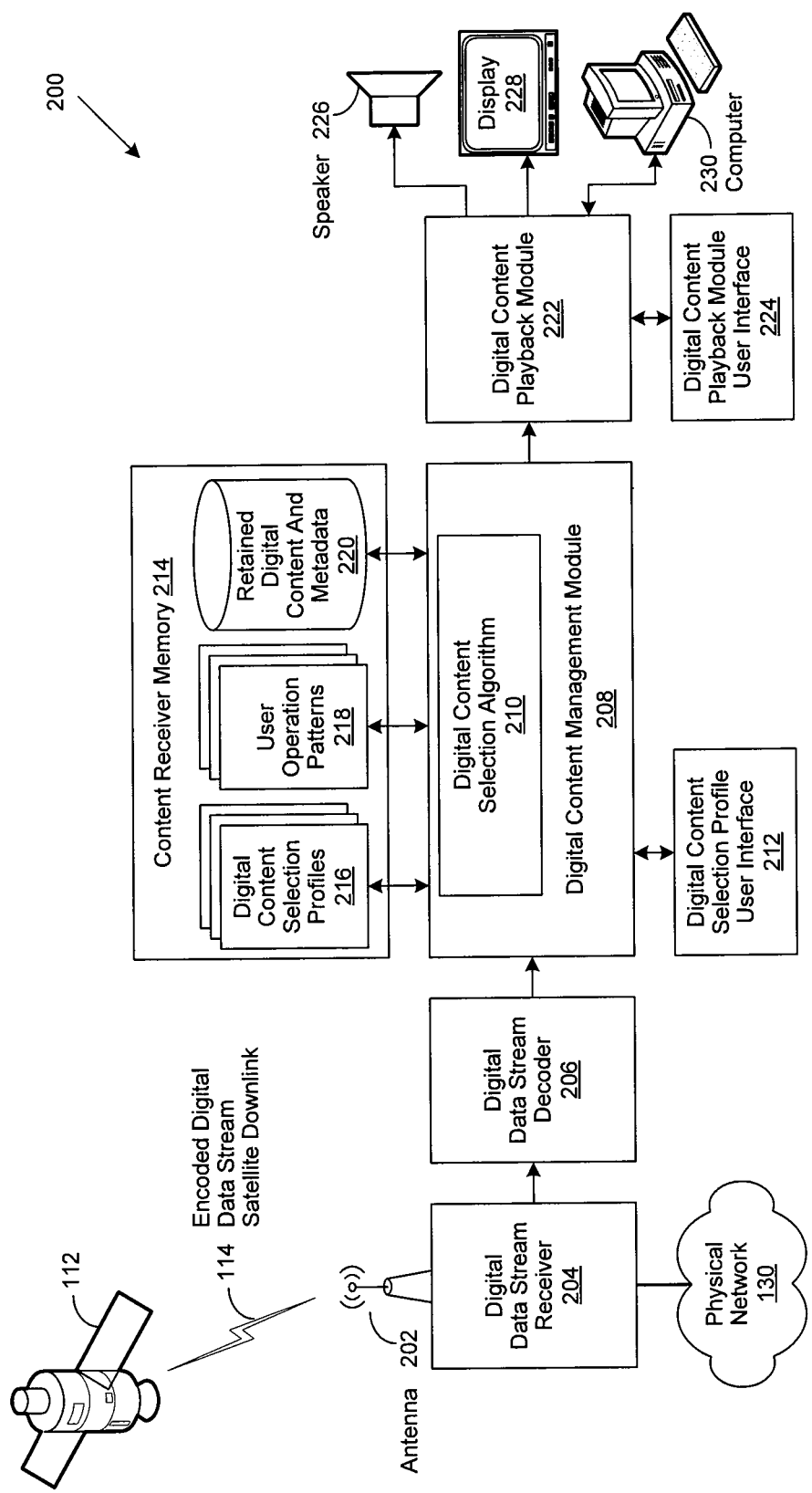
FIG. 2 is a simplified block diagram of a content receiver as implemented in accordance with an embodiment of the invention for the controlled conveyance of digital content.

FIG. 2 is a simplified block diagram of a content receiver 200 as implemented in accordance with an embodiment of the invention for the controlled conveyance of digital content. In one embodiment, encoded digital data streams are broadcast by the satellite 112 as a satellite downlink 114 to the antenna 202 coupled to digital data stream receiver 204. In another embodiment, encoded digital data streams are received by the digital data stream receiver 204 through a connection to a physical network 130, such as the Internet. The digital data stream receiver 204 conveys the encoded digital data streams to the digital data stream decoder 206 where they are decoded into digital content and associated metadata.

Once decoded, the digital content and associated metadata become candidates for controlled conveyance and are received by the digital content management module 208, which comprises a digital content selection algorithm 210. Various aspects of embodiments of such a management module and content selection algorithms and associated processes are further described and illustrated herein and in the related applications, in particular U.S. Utility patent application Ser. No. 11/923,573, incorporated by reference in its entirety herein.

In some embodiments, the digital content selection algorithm ("selection algorithm") 210 compares the metadata associated with the candidate digital content to a predetermined digital content selection profile ("selection profile") 216 stored in the content receiver memory 214. If the selection algorithm 210 determines that the metadata matches predetermined selection parameters of the predetermined selection profile 216, then the candidate digital content and its associated metadata are stored as retained digital content and metadata 220 in the content receiver memory 214. In one embodiment, predetermined selection profiles 216 are created and edited through user interaction with the digital content management module 208 through the digital content selection profile user interface ("selection profile UI") 212. User preferences, such as genre of music, era, performer, popularity, time-of-day, etc. are chosen and stored as selection parameters in one or more digital content selection profiles 216. Using the selection profile UI, a user can create, save, and revise a plurality of selection profiles. For example, one selection profile may be created for morning drive time (e.g., time-of-day parameter), when the user prefers to listen to "pop" music (e.g., genre parameter). Another selection profile may be created by the same user for evening drive time (e.g., time-of-day parameter), when the user prefers to listen to "talk" radio (e.g., genre parameter). Yet another selection profile may be created by the same user for late evening (e.g., time-of-day parameter), when the user prefers to listen to jazz music (e.g., genre parameter). It will be apparent that a wide variety of other selection profiles may also be created.

In another embodiment, user operations during digital content playback are captured and then correlated to the digital content's associated metadata by the selection algorithm 210. The resulting user operation patterns 218 are stored in the content receiver memory 214 and are used by the digital content management module 208 to modify the selection parameters of the selection profile 216 in use during playback of the digital content. User actions correlating to user approval of the digital content during playback (e.g., increase in volume) result in selection parameters being weighted towards other candidate digital content that has similar associated metadata. Similarly, user actions correlating to user disapproval of the digital content during playback (e.g., skipping to the next selection) result in selection parameters being weighted against other candidate digital content that has similar associated metadata.

In some embodiments, the digital content management module 208 applies the selection algorithm 210 to the retained digital content and metadata 220 stored in receiver memory 214 to determine the order in which the retained digital content and metadata 220 will be played. In one embodiment, the retained digital content and metadata 220 is retrieved from the content receiver memory 214 using a first-in, first-out sequence for playback. As the retrieved digital content and metadata 220 is played, it is deleted from the content receiver memory 214. In another embodiment, the selection algorithm generates a content selection rating value that is appended to the metadata of the candidate digital content. Once the content selection rating value is applied to the metadata, the candidate digital content and its associated metadata are stored as retained content and metadata 220 in content receiver memory 214.

The content selection rating value may then be used by the digital content management module to prioritize the retained content and metadata 220 for playback. As an example, a predetermined selection profile may indicate that the user prefers rock music. The first of three digital content candidates is received and is processed by the digital content management module 208. The selection algorithm performs comparison operations between the predetermined selection profile 216 and the metadata associated with the digital content and determines the candidate digital content belongs to the "pop" genre of music. As a result, the selection algorithm determines that a moderate content selection rating value is appropriate for the candidate digital content, which it then applies to its associated metadata. Once the content selection rating value is applied, the candidate digital content is stored as retained digital content and metadata 220 in receiver memory 214. The second of the three digital content candidates is then received and processed by the digital content management module 208. The selection algorithm performs comparison operations between the predetermined selection profile 214 and the metadata associated with the digital content and determines the candidate digital content belongs to the "jazz" genre of music. As a result, the selection algorithm determines that content selection rating value for the candidate digital content is too low for retention and the digital content and its associated metadata are discarded.

The third of the three digital content candidates is then received and processed by the digital content management module 208. The selection algorithm performs comparison operations between the predetermined selection profile 216 and the metadata associated with the digital content and determines the candidate digital content belongs to the "rock" genre of music. As a result, the selection algorithm determines that a "high" content selection rating value is appropriate for the candidate digital content, which it applies to its associated metadata. Once the content selection rating value is applied, the candidate digital content is stored as retained digital content and metadata 220 in content receiver memory 214. The digital content management module 208 then uses the content selection rating value to prioritize the retrieval of the retained digital content and metadata stored in the content receiver memory 214 for presentation to the digital content playback module ("playback module") 222. In this example, the retained digital content whose associated metadata comprises the "rock" music genre would have precedence over the retained digital content whose associated metadata comprises metadata for the "pop" music genre.

The retrieved digital content and its metadata are then presented in the predetermined sequence to the digital content playback module 222 for playback. In one embodiment, the output from the playback module 222 is an analog audio stream played through speaker 226. In another embodiment, the output from the playback module is a visual stream presented on display 228. In yet another embodiment, the output from the playback module is a digital content stream conveyed to an information processing system, such as computer 230. In this embodiment, the digital content stream is converted by the computer 230 into audio and video formats supported by the output components of the computer 230. In one embodiment, playback of the retrieved digital content and metadata by the digital content playback module is controlled by the digital content playback module user interface 224. In another embodiment, playback of the retrieved digital content and metadata by the digital content playback module is controlled by user interaction with the computer 230.

Figure 2B:
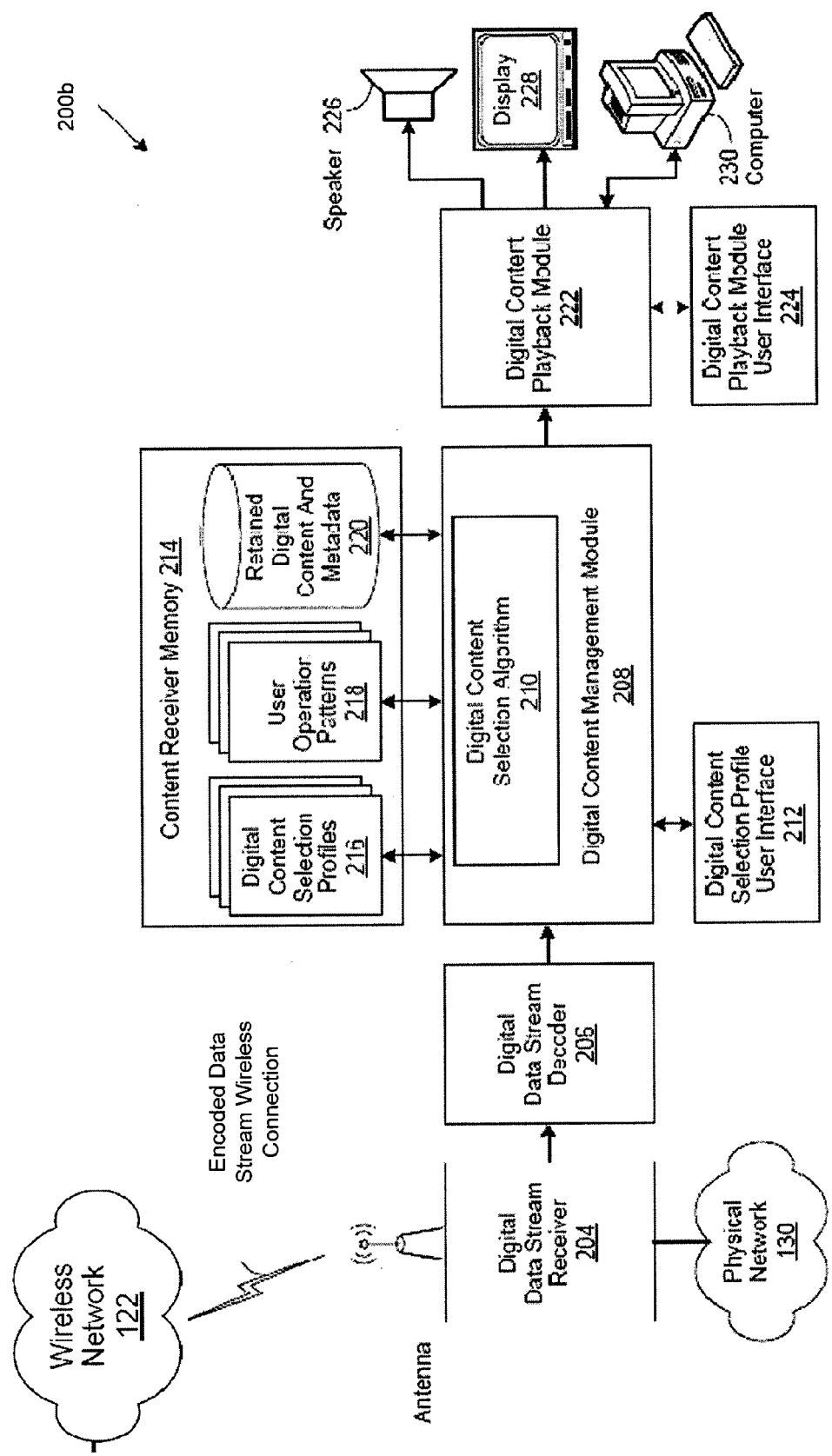

FIG. 2b illustrates another embodiment a content receiver 200b wherein the digital content and associated metadata are transmitted to the playback device at least in part via a terrestrial network, such as a wired or wireless network 122. In one exemplary embodiment, a Wi-Fi (IFEE 802.11) wireless local area network may be used to send the digital content to the digital content receiver; however, other local or wide area networking schemes may also be used. It is noted that the wireless network 122 shown in FIG. 2b may be used in addition to, or in place of, the satellite network as illustrated in FIG. 2. This may advantageously provide for simultaneous transmission and reception of digital content on both satellite and wireless networks, as well as sequential reception of digital content from the satellite and wireless networks.

Figure 3:
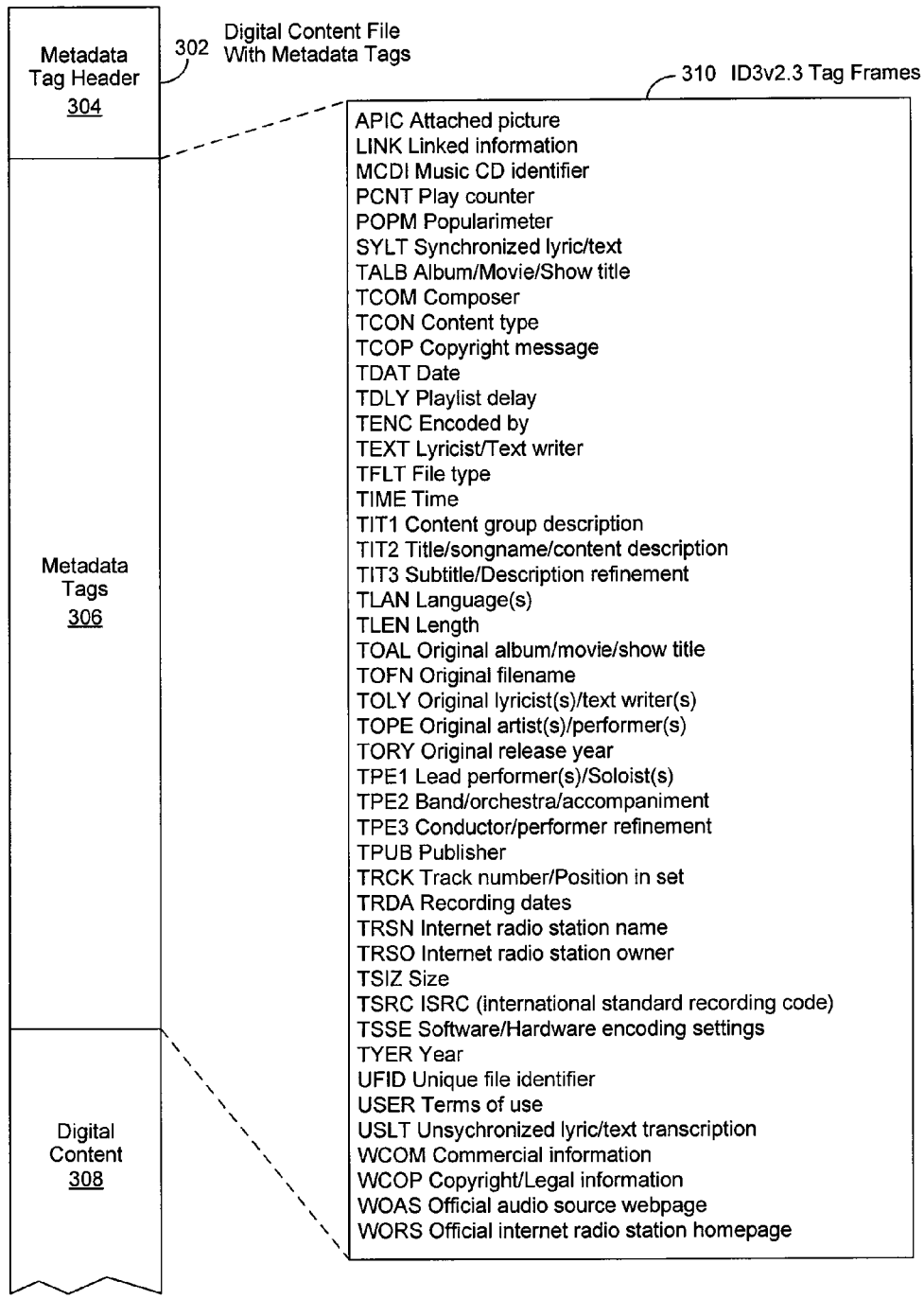
FIG. 3 is a generalized illustration of metadata tags as implemented in accordance with an embodiment of the invention to provide metadata for digitized content.

FIG. 3 is a generalized illustration of metadata tags 306 as implemented in accordance with an embodiment of the invention to provide metadata for digitized content 308. In this illustration, a digital content file with associated metadata tags 302 comprises a metadata tag header 304 and metadata tags 306 prepended to digital content 308. In one embodiment, metadata tags 306 comprise ID3v2.3 tag frames 310. ID3v2 tag frames typically occur at the start of a digital content file to aid streaming media and are of variable size, each of which comprises predetermined metadata. For example, ID3v2 tag frames 310 in common usage comprise but are not limited to: MCDI—music CD identifier, PCNT— play counter, POPM—popularimeter, SYLT—synchronized lyric/text, TALB—album title, TCOM —Composer, TCOP—Copyright message, TIT2—title/song name, TLAN—language(s), TLEN—length, TPE1—performer, TPUB—publisher, TRSN—Internet radio station name, and TRSO—Internet radio station owner.

Those of skill in the art will recognize that the extensible, frame-based data structure of ID3v2.3 metadata tags allows the flexible accommodation of a wide variety of digital content metadata ("metadata"). In different embodiments, predetermined metadata tags 306 of candidate digital content are processed by a digital content management module comprising a digital content selection algorithm ("selection algorithm"). The algorithm performs comparison operations between the metadata tags 306 and the metadata selection parameters of a predetermined selection profile.

In one embodiment, candidate digital content whose associated metadata tags 306 correspond to the metadata selection parameters of the predetermined selection profile are stored as retained digital content and metadata in the memory of the content receiver. Likewise, candidate digital content whose associated metadata tags 306 do not correspond to the metadata selection parameters of the predetermined selection profile are discarded by the digital content management module. In another embodiment, the digital content management module performs comparison operations by applying the metadata tags 306 of the candidate digital content 308 to the selection algorithm. If the selection algorithm determines that the candidate digital content and metadata is to be retained for conveyance, it then calculates a content selection rating value based on the degree to which the metadata tags 306 meet the selection parameters of the selection profile.

In one embodiment, the content selection rating value is then prepended as additional metadata to the candidate digital content and the candidate digital content and its associated metadata are stored as retained content and metadata in the content receiver's memory. In another embodiment, the content selection rating value is calculated each time the selection profile or metadata changes. In another embodiment, the selection rating values are re-calculated as part of an operation that makes use of the selection ratings so as to ensure that the ratings incorporate recent actions or events. The content selection rating value is then used by the digital content management module to prioritize the retained content and metadata for playback as described in greater detail herein. Skilled practitioners of the art will appreciate that metadata as used in the foregoing description is used in its broadest sense to refer to any information directly or indirectly associated with digital content, including but not limited to file size, genre, artist/author, song title, album, popularity, etc.

Figure 4:
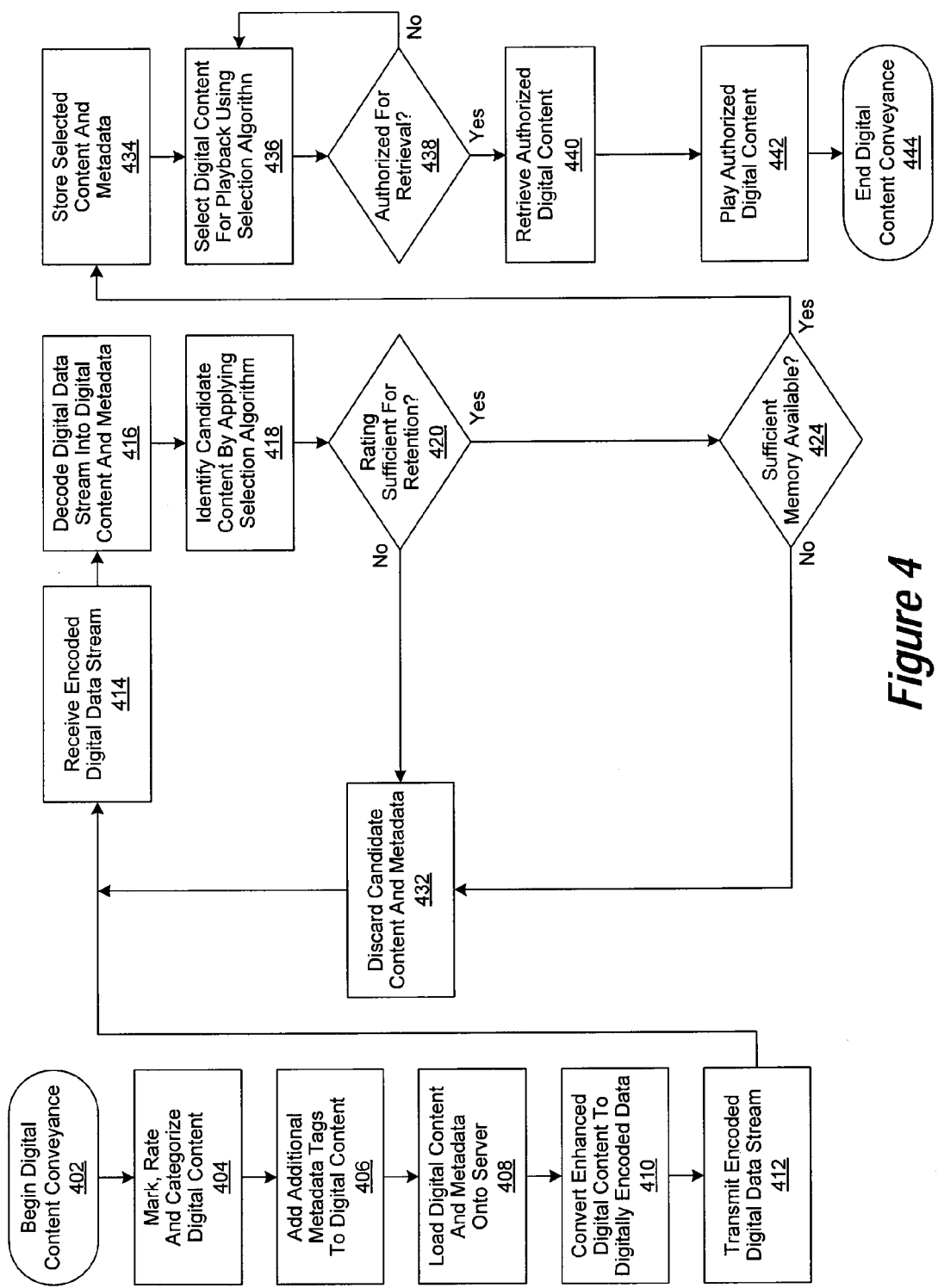
FIG. 4 is a flowchart illustration of the controlled conveyance of digital content using a first-in, first-out sequence as implemented in accordance with an embodiment of the invention.

FIG. 4 is a flowchart illustration of the controlled conveyance of digital content using a first-in, first-out sequence as implemented in accordance with an embodiment of the invention. In some embodiments of the invention, controlled conveyance of digital content begins in step 402 with marking, rating, and categorization operations familiar to those of skill in the art performed in step 404 on the digital content to be conveyed. If additional metadata tags are required, they are added to the metadata associated with the digital content to be conveyed in step 406. The digital content and metadata are then loaded onto a digital content conveyance server in step 408, where it is converted into encoded digital data in step 410. Once conversion is completed, the encoded digital data is transmitted as a plurality of encoded digital data streams in step 412. In one embodiment, the encoded digital data streams are routed through a distribution network to a terrestrial satellite uplink where they are transmitted as an encoded digital data stream to a satellite. Once received, the data streams are broadcast by the satellite as a satellite downlink to a plurality of digital content reception venues where they are received by a plurality of content receivers in step 414.

In another embodiment, the data streams are routed through a distribution network to a wireless network where they are wirelessly transmitted. Those of skill in the art will appreciate that the wireless network may comprise a IEEE 802.11 (WiFi) network or other wired or wireless networks such as those based on 802.15, 802.16, or cellular networks. For example, the wireless network may comprise a cellular network implemented with data communication capabilities such as General Packet Radio Service (GPRS), Enhanced Data Rates for GSM Evolution (EDGE), or any other cellular data protocol. Furthermore, intermediate physical networks, such as the Internet, may be implemented for the conveyance of the data streams from the distribution network to the wireless network. In different embodiments, the data streams are then broadcast to be received by a plurality of wireless-enabled content receivers, such as a wireless media player or mobile computer in step 414. Those of skill in the art will appreciate that the broadcast can be implemented with a point-to-point connection-based protocol such as TCP/IP as well as with a multi-cast protocol. That is, the digital conveyance server may establish a plurality of connections with receivers and thus implement a broadcast by transmitting the data streams individually to each receiver. Moreover, in a point-to-point environment, the data streams need not be sent to different receivers at exactly or even nearly the same time.

In yet another embodiment, the data streams are routed through a distribution network to a physical network, such as the Internet, to a plurality of stationary computers. Once received, the data streams are decoded into metadata and digital content for controlled conveyance and playback by the stationary computer as described in greater detail herein. Once the encoded digital data stream has been received, it is decoded into its original digital content and associated metadata state in step 416.

Once decoded, the digital content and associated metadata become candidates for controlled conveyance and are received by a digital content management module, which comprises a digital content selection algorithm ("selection algorithm"). In some embodiments, the selection algorithm compares the metadata associated with the candidate digital content to a predetermined digital content selection profile ("selection profile") in step 418. If the selection algorithm determines in step 420 that the metadata does not match predetermined selection parameters of the predetermined selection profile, then the candidate digital content and associated metadata are discarded in step 432. The process is then repeated, beginning in step 414. Various aspects of embodiments of such selection algorithms and associated processes are further described and illustrated herein and in the related applications, in particular U.S. Utility patent application Ser. No. 11/923,573, incorporated by reference in its entirety herein.

If the selection algorithm determines in step 420 that the metadata matches predetermined selection parameters of the predetermined selection profile, then it is determined in step 424 whether sufficient memory is available to store the candidate digital content and metadata. If sufficient memory is unavailable, then the candidate digital content and associated metadata are discarded in step 432. The process is then repeated, beginning in step 414. Otherwise, the candidate digital content and its associated metadata are stored as retained digital content and metadata in the content receiver's memory in step 434.

The content selection algorithm may then be used in step 436 to select retained digital content and metadata for playback. In one embodiment, the retained digital content and metadata is selected using a first-in, first-out sequence. In another embodiment, the retained digital content and metadata is selected using a content selection rating value that has been generated by the content selection algorithm and then appended to the metadata of the retained digital content. In another embodiment, the selection ratings are calculated as part of the selection operation. Digital content with associated metadata comprising a higher rating are given preference for selection. Various aspects of such selection algorithms and related processes are further describe herein and in the related applications, in particular U.S. Utility patent application Ser. No. 11/923,573, incorporated by reference in its entirety herein.

If the retained digital content and metadata selected for playback in step 436 is not authorized for retrieval in step 438, then the process is repeated beginning with step 436. For example, digital content may be selected for playback and its associated metadata displayed to the user. The user may decide to retain the digital content for later playback or to delete the retained digital content from the content receiver's memory. If so, then other digital content is selected and its associated metadata presented until the user authorizes the digital content selection for playback. If the retained digital content and metadata selected for playback is authorized for retrieval in step 438, then the selected digital content and its associated metadata is retrieved from the content receiver's memory in step 440. The retrieved digital content and metadata are played in step 442 and controlled conveyance of digital content ends in step 444. It will be apparent to those of skill in the art that the determination of which candidate digital content and associated metadata is to be retained in this embodiment may be based on the availability of sufficient memory for its storage.

Figure 5:
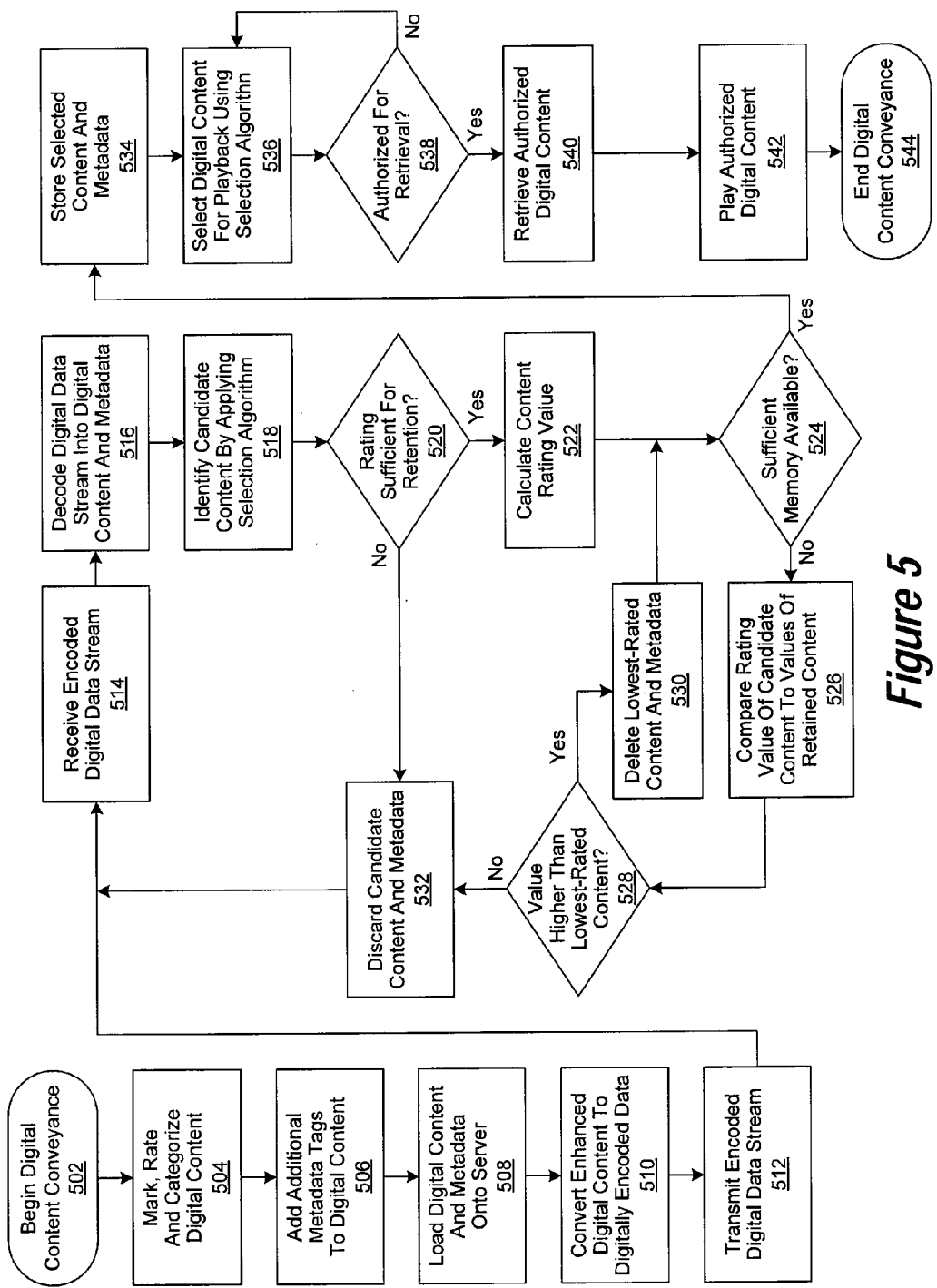
FIG. 5 is a flowchart illustration of the controlled conveyance of digital content using a prioritization sequence as implemented in accordance with an embodiment of the invention.

FIG. 5 is a flowchart illustration of the controlled conveyance of digital content using a prioritization sequence as implemented in accordance with an embodiment of the invention. In some embodiments of the invention, controlled conveyance of digital content begins in step 502 with marking, rating and categorization operations familiar to those of skill in the art performed in step 504 on the digital content to be conveyed. If additional metadata tags are required, they are added to the metadata associated with the digital content to be conveyed in step 506. The digital content and metadata are then loaded onto a digital content conveyance server in step 508, where it is converted into encoded digital data in step 510. Once conversion is completed, the encoded digital data is transmitted as a plurality of encoded digital data streams in step 512. In one embodiment, the encoded digital data streams are routed through a distribution network to a terrestrial satellite uplink where they are transmitted as an encoded digital data stream to a satellite. Once received, the data streams are broadcast by the satellite as a satellite downlink to a plurality of digital content reception venues where they are received by a plurality of content receivers in step 514.

In another embodiment, the data streams are routed through a distribution network to a wireless network where they are transmitted to be received by a plurality of wireless-enabled content receivers, such as a wireless media player or mobile computer in step 514. In yet another embodiment, the data streams are routed through a distribution network to a physical network, such as the Internet, to a plurality of stationary computers. Once received, the data streams are decoded into metadata and digital content for controlled conveyance and playback by the stationary computer as described in greater detail herein and in the related application, in particular in U.S. Utility patent application Ser. No. 11/923,573, incorporated by reference in its entirety herein. Once the encoded digital data stream has been received, it is decoded into its original digital content and associated metadata state in step 516.

Once decoded, the digital content and associated metadata become candidates for controlled conveyance and are received by a digital content management module, which comprises a digital content selection algorithm ("selection algorithm"). In some embodiments, the selection algorithm compares the metadata associated with the candidate digital content to a predetermined digital content selection profile ("selection profile") in step 518. If the selection algorithm determines in step 520 that the metadata does not match predetermined selection parameters of the predetermined selection profile, then the candidate digital content and associated metadata are discarded in step 532. The process is then repeated, beginning in step 514.

If the selection algorithm determines in step 520 that the metadata matches the predetermined selection parameters of the predetermined selection profile, then it generates a content selection rating value in step 522. As an example, a predetermined selection profile may indicate that the user prefers rock music. The first of three digital content candidates is received and is processed by the digital content management module. The selection algorithm performs comparison operations between the predetermined selection profile and the metadata associated with the digital content and determines the candidate digital content belongs to the "pop" genre of music. As a result, the selection algorithm determines that a moderate content selection rating value is appropriate for the candidate digital content. The second of the three digital content candidates is then similarly received and processed. The selection algorithm determines through its metadata comparison operations that the candidate digital content belongs to the "jazz" genre of music. As a result, the selection algorithm determines that a low content selection rating value is appropriate. The third of the three digital content candidates is then similarly received and processed. The selection algorithm determines through its metadata comparison operations that the candidate digital content belongs to the "rock" genre of music. As a result, the selection algorithm determines that a high content selection rating value is appropriate.

Once calculated, the content selection rating value is then appended to the metadata of the candidate digital content in step 522 and the digital content management module checks for memory availability in step 524. If it is determined in step 524 that insufficient memory is available to store the candidate digital content and its associated metadata, then the content selection rating value of the candidate digital content is compared to the rating values of currently retained content in step 526. If it is determined in step 528 that the content selection rating value of the candidate digital content is higher than the lowest-rated value of currently retained content, then the lowest-rated retained digital content and associated metadata are deleted in step 530. The process is then repeated, beginning with step 524 to determine if the deletion of the lowest-rated digital content has resulted in the availability of sufficient memory. If it is determined in step 528 that the content selection rating value of the candidate digital content is lower than the lowest rated value of currently retained content, then the candidate digital content and its associated metadata are discarded in step 532. The process is then repeated, beginning with step 514.

If it is determined in step 524 that sufficient memory is available to store the candidate digital content and its metadata, then they are stored as retained digital content and metadata in the content receiver's memory in step 534. Various aspects of such selection algorithms and related processes are further described herein and in the related applications, in particular U.S. Utility patent application Ser. No. 11/923,573, incorporated by reference in its entirety herein.

The content selection algorithm may then be used in step 536 to select retained digital content and metadata for playback. In one embodiment, the retained digital content and metadata is selected using a first-in, first-out sequence. In another embodiment, the retained digital content and metadata is selected using the content selection rating value that has been generated by the content selection algorithm and then appended to the metadata of the retained digital content. Digital content with associated metadata comprising a higher rating are given preference for selection.

If the retained digital content and metadata selected for playback in step 536 is not authorized for retrieval in step 538, then the process is repeated beginning with step 536. For example, digital content may be selected for playback and its associated metadata displayed to the user. The user may decide to retain the digital content for later playback or to delete the retained digital content from the content receiver's memory. If so, then other digital content is selected and its associated metadata presented until the user authorizes the digital content selection for playback. If the retained digital content and metadata selected for playback is authorized for retrieval in step 538, then the selected digital content and its associated metadata is retrieved from the content receiver's memory in step 540. The retrieved digital content and metadata are played in step 542 and controlled conveyance of digital content ends in step 544. It will be apparent to those of skill in the art that the determination of which candidate digital content and associated metadata is to be retained in certain embodiments is based on a combination of its content selection rating value and the availability of sufficient memory for its storage; however, other methods of determination are also possible and contemplated. Various aspects of such playback selection algorithms and related processes are further described herein and in the related applications, in particular U.S. Utility patent application Ser. No. 11/923,573, incorporated by reference in its entirety herein.

Figure 6:
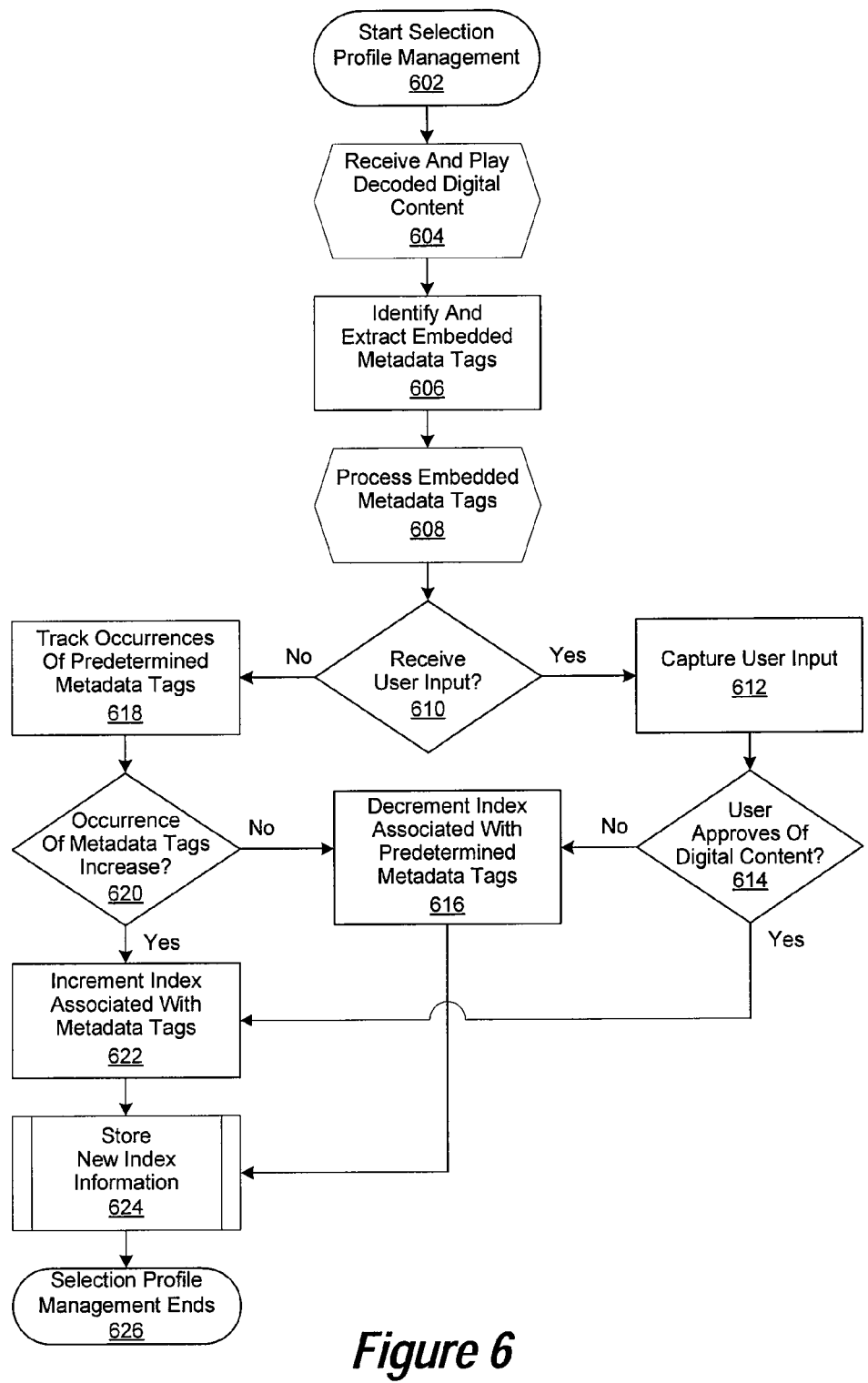
FIG. 6 is a generalized flowchart illustrating an embodiment of the invention as implemented for the automatic management of a digital content selection profile.

FIG. 6 is a generalized flow chart illustrating an embodiment of the invention as implemented for the automatic management of a digital content selection profile. In this embodiment, automatic generation of a digital content selection profile begins in step 602, followed by the receipt and playback of a plurality of decoded digital content in step 604. As the digital content is played, a digital content management module examines associated metadata in step 606 and extracts metadata tags. These metadata tags are then processed in step 608 as described in greater detail herein to generate or revise the content selection profile in current use.

If it is determined in step 610 that no user input is received, then the number of past occurrences of predetermined metadata tag values is determined in step 618. If it is determined in step 620 that the inclusion of the metadata tag values of the currently-played digital content increases the number of past occurrences of predetermined metadata tag values, then their corresponding index values are incremented in step 622. As an example, if "The Beatles" is the value stored in the artist metadata tag frame of the currently-played digital content, and there are past occurrences of the same artist in the current content selection profile, then their corresponding index values are incremented. Once the metadata tag index values are incremented, their updated values are stored in the current content selection profile in step 624 and automatic management of content selection profiles ends in step 626.

However, if it is determined in step 620 that the inclusion of the metadata tag values of the currently-played digital content does not increase the number of past occurrences of predetermined metadata tag values, then their corresponding index values are decremented in step 622. Once the metadata tag index values are decremented, their updated values are stored in the current content selection profile in step 624 and automatic management of content selection profiles ends in step 626.

If it is determined in step 610 that user input is received, then the user input is captured in step 612. For example, a user may increase the volume during digital content playback, signifying approval. Alternatively, the user may indicate through user interaction with the content receiver during playback (e.g., pressing an "approval" button), similarly signifying approval. Conversely, the user may decide to cancel playback of the digital content or press a "disapproval" button. If it is determined in step 614 that the user approves of the currently-played content, then the index associated with a predetermined metadata tag frame is incremented in step 622. Once the predetermined metadata tag index value has been incremented, its updated value is stored in the current content selection profile in step 624 and automatic management of content selection profiles ends in step 626. However, if it is determined in step 614 that the user disapproves of the currently-played content, then the index associated with a predetermined metadata tag frame is decremented in step 616. Once the predetermined metadata tag index value has been decremented, its updated value is stored in the current content selection profile in step 624 and automatic management of content selection profiles ends in step 626. Various aspects of automatic management of digital content selection profiles and related processes are further described herein and in the related applications, in particular U.S. Utility patent application Ser. No. 11/923,573, incorporated by reference in its entirety herein.

Figure 7:
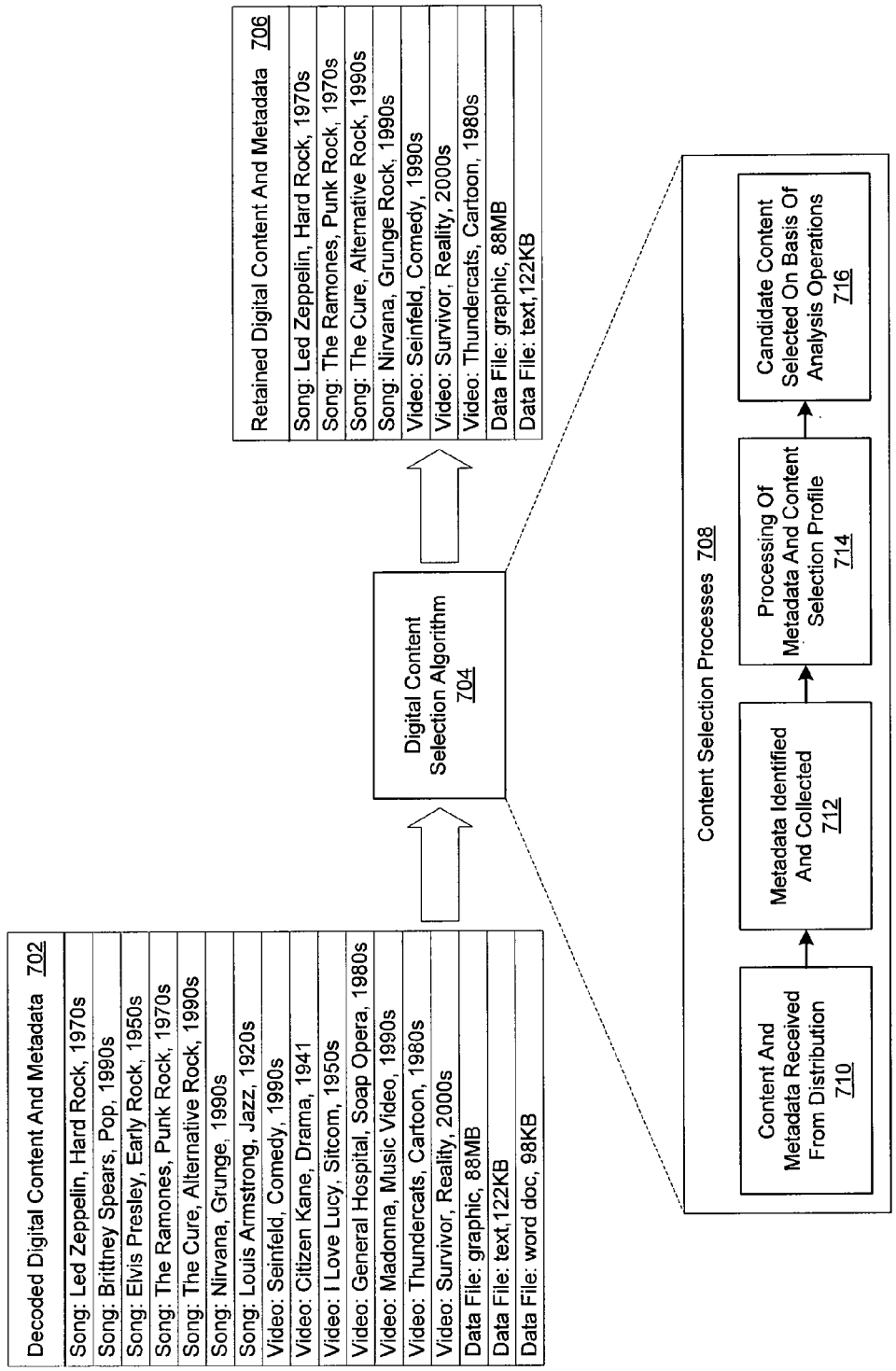
FIG. 7 is a simplified block diagram of the implementation of a digital content selection algorithm as implemented in accordance with an embodiment of the invention for controlling the conveyance of digital content.

FIG. 7 is a simplified block diagram of an implementation of a digital content selection algorithm in accordance with an embodiment of the invention for controlling the conveyance of digital content. In this embodiment, decoded digital content and metadata 702 is processed by a digital content management module comprising a digital content selection algorithm 704. In various embodiments, the selection algorithm 704 is applied to candidate digital content and its associated metadata to perform content selection processes described in greater detail herein resulting in the generation of retained digital content and associated metadata 706. In one embodiment, the content selection processes 708 comprise receipt of digital data streams that are decoded to generate digital content and associated metadata 710. The associated metadata is identified and collected 712 and processed in correlation with a content selection profile 714 by a digital content management module. As a result, candidate digital content is selected on the basis of the analysis operations 716 resulting in retained digital content and associated metadata 706, which is stored in the content receiver's memory. Various aspects of such digital content selection algorithms and related processes are further described herein and in the related applications, in particular U.S. Utility patent application Ser. No. 11/923,573, incorporated by reference in its entirety herein.

Figure 8:
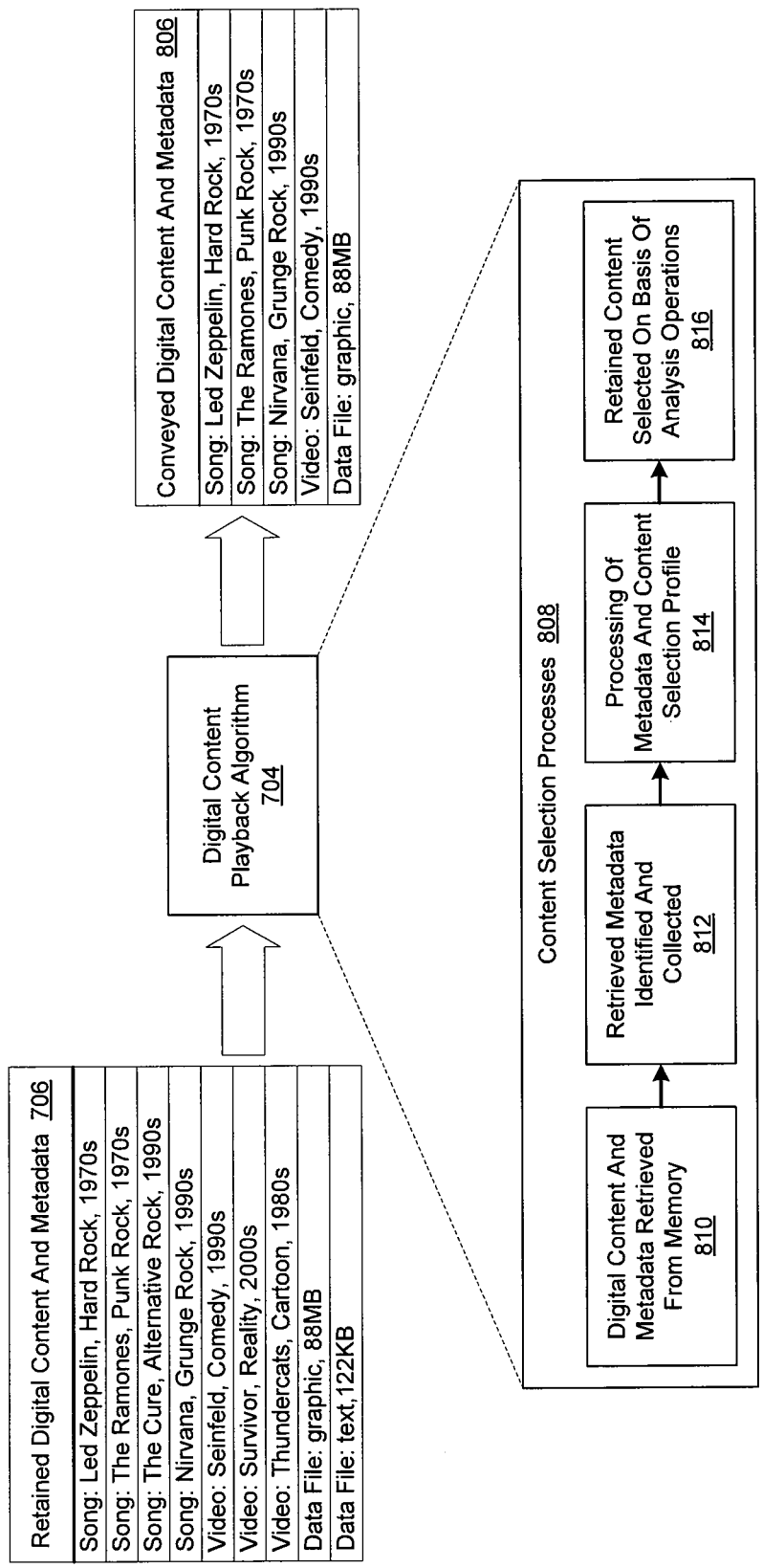
FIG. 8 is a simplified block diagram of the implementation of a digital content selection algorithm as implemented in accordance with an embodiment of the invention for selecting digital content for playback.

FIG. 8 is a simplified block diagram of an implementation of a digital content selection algorithm in accordance with an embodiment of the invention for selecting digital content for playback. In this embodiment, retained digital content and metadata 706 is processed by a digital content management module comprising a digital content selection algorithm 704. In various embodiments, the selection algorithm 704 is applied to retained digital content and its associated metadata to perform content selection processes described in greater detail herein resulting in the selection of digital content and associated metadata 706 conveyed for playback. In one embodiment, the content selection processes 808 comprise retained digital content and associated metadata that is retrieved 810 from the content receiver's memory. The retrieved metadata is identified and collected 812 and processed in correlation with a content selection profile 814 by a digital content management module. As a result, retained digital content is selected on the basis of the analysis operations 816 resulting in the selection of digital content and associated metadata 806 conveyed for playback. Various aspects of such digital content selection algorithms and related processes are further described herein and in the related applications, in particular U.S. Utility patent application Ser. No. 11/923,573, incorporated by reference in its entirety herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is further noted that the various blocks, stages, and steps are provided for purposes of illustration, not limitation. Accordingly, other systems and processes having fewer, more, or different blocks or process steps or stages are also within the spirit and scope of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the spirit and scope of the invention as defined by the appended claims and their equivalents.

What is claimed is:

1. A content receiver, comprising:
   a digital data stream receiver operable to receive a non-real-time conveyance of a plurality of encoded digital data streams;
   a digital data stream decoder configured to extract digital content and metadata associated with said digital content from the plurality of encoded digital data streams;
   a storage medium in which are stored digital content selection profiles and profiled digital content files;
   a digital content management module operable to:
      receive user input and to responsively initiate generation of said digital content selection profiles wherein the generation of said digital content selection profiles is automatically initiated upon receipt of said user input;
      use said user input to generate user operation patterns;
      determine, subsequent to extraction by the digital data stream decoder of at least a portion of the digital content and the metadata and based on said metadata and said content selection profiles, to selectively generate and store said profiled digital content files in said storage medium, each of said profiled digital content files being comprised of a portion of said digital content and being associated with at least one of said digital content selection profiles; and
   a digital content playback module operable to generate audio signals using said profiled digital content files, wherein each of said plurality of profiled digital content files is determined to be generated and stored in said storage medium prior to generating the audio signals using the associated digital content and wherein said user operation patterns are used to generate selection parameters for managing said profiled digital content files.

2. The content receiver of claim 1, wherein said selection parameters are used to control the sequence for generating audio signals from said profiled digital content files.

3. The content receiver of claim 2, wherein said selection parameters comprise a content rating value.

4. The content receiver of claim 1 wherein the digital content management module is operable to generate the digital content selection profiles, each of the digital content selection profiles comprising metadata selection parameters.

5. The content receiver of claim 4 wherein the digital content management module is further operable to perform comparison operations involving the metadata and the metadata selection parameters of a predetermined one of the digital content selection profiles.

6. The content receiver of claim 5 wherein the digital content management module is further configured to discard portions of said digital content associated with portions of the metadata not corresponding to the metadata selection parameters.

7. The content receiver of claim 6 wherein the digital content management module is further configured to select for storage other portions of said digital content associated with other portions of the metadata corresponding to the metadata selection parameters.

8. The content receiver of claim 1, wherein said digital content management module is further operable to:
receive a user input while audio signals are being generated using a first one of the stored profiled digital content files, said user input affecting how said audio signals are being generated, and
upon receiving said user input, revise one of said digital content selection profiles so as to affect future selections of said one of said stored profiled digital content files.

9. A method, comprising:
receiving and decoding a non-real-time conveyance of a plurality of encoded digital data streams comprising digital content and metadata, thereby extracting said digital content and metadata associated with said digital content;
generating a plurality of digital content selection profiles comprising metadata selection parameters;
determining, subsequent to the extracting and based on said metadata and said metadata selection parameters, to selectively generate a plurality of profiled digital content files comprising digital content and being associated with said metadata selection parameters;
receiving user input and responsively initiating generation of said digital content selection profiles wherein the generating of said digital content selection profiles is automatically initiated upon receipt of said user input;
using said user input to generate user operation patterns;
storing said selectively generated plurality of profiled digital content files; and
generating audio signals using said profiled digital content files, wherein each of said plurality of profiled digital content files is determined to be generated and stored prior to generating the audio signals using the associated digital content and wherein said user operation patterns are used to generate selection parameters for managing said profiled digital content files.

10. The method of claim 9, further comprising: using said selection parameters to control the sequence for generating audio signals from said profiled digital content files.

11. The method of claim 10, wherein said selection parameters comprise a content rating value.

12. The method of claim 9, further comprising:
receiving a user input while audio signals are being generated using a first one of the stored profiled digital content files, said user input affecting how said audio signals are being generated, and
upon receiving said user input, revise one of said digital content selection profiles so as to affect future selections of said one of said stored profiled digital content files.

13. A content receiver device for receiving and processing digital information for controlled, non-real-time conveyance, comprising:
a decoder operable to receive a non-real-time conveyance of a plurality of encoded digital data streams comprising digital content and metadata and to decode said plurality of encoded digital data streams, thereby extracting said digital content and associated metadata therefrom;
a digital content management module operable to:
generate a plurality of digital content selection profiles comprising metadata selection parameters, and, subsequent to the extracting, to determine, based on said metadata and said metadata selection parameters, to selectively generate a plurality of profiled digital content files comprising digital content and being associated with said metadata selection parameters;
receive user input and to responsively initiate generation of said digital content selection profiles wherein the generation of said digital content selection profiles is automatically initiated upon receipt of said user input;
use said user input to generate user operation patterns;
a storage medium operable to store said selectively generated profiled digital content files; and
a digital content playback module operable to generate audio signals using said profiled digital content files, wherein each of said plurality of profiled digital content files is determined to be generated and stored prior to generating the audio signals using the associated digital content and wherein said user operation patterns are used to generate selection parameters for managing said profiled digital content files.

14. The content receiver device of claim 13, wherein said selection parameters are used to control the sequence for generating audio signals from said profiled digital content files.

15. The content receiver device of claim 14, wherein said selection parameters comprise a content rating value.

16. The content receiver device of claim 13, wherein said digital content management module is further operable to:
receive a user input while audio signals are being generated using a first one of said stored profiled digital content files, said user input affecting how said audio signals are being generated, and
upon receiving said user input, revise one of said digital content selection profiles so as to affect future selections of said one of said stored profiled digital content files.

17. A method, comprising:
receiving and decoding a plurality of encoded digital data streams comprising digital content and metadata, thereby extracting said digital content and metadata;
generating a plurality of digital content selection profiles comprising metadata selection parameters;
determining, based on said metadata and said metadata selection parameters, to selectively generate a plurality of profiled digital content files comprising digital content and being associated with said metadata selection parameters;
storing said selectively generated plurality of profiled digital content files;
generating audio signals during playback of said profiled digital content files, wherein each of said plurality of profiled digital content files is determined to be generated and stored prior to generating the audio signals using the associated digital content;
receiving user input relating to the playback of said profiled digital content files; and
generating patterns using the user input wherein the generating the plurality of digital content selection profiles is based upon the patterns.

* * * * *